(12) United States Patent
Sakamoto et al.

(10) Patent No.: US 7,489,497 B2
(45) Date of Patent: Feb. 10, 2009

(54) ELECTROCHEMICAL DEVICE

(75) Inventors: Ryuichi Sakamoto, Tokyo (JP); Minoru Takeishi, Tokyo (JP); Masahiro Koshimizu, Tokyo (JP)

(73) Assignee: TDK Corporation, Tokyo (JP)

( * ) Notice: Subject to any disclaimer, the term of this patent is extended or adjusted under 35 U.S.C. 154(b) by 237 days.

(21) Appl. No.: 11/637,719

(22) Filed: Dec. 13, 2006

(65) Prior Publication Data
US 2007/0139865 A1    Jun. 21, 2007

(30) Foreign Application Priority Data
Dec. 15, 2005    (JP)    ............................. P2005-361322

(51) Int. Cl.
*H01G 9/00*    (2006.01)
(52) U.S. Cl. .................. 361/502; 361/503; 361/504; 361/508; 361/512; 361/301.4
(58) Field of Classification Search .............. 361/502, 361/503–504, 508–512, 301.2, 301.3, 301.4, 361/516–519; 429/121, 149
See application file for complete search history.

(56) References Cited

U.S. PATENT DOCUMENTS

| | | | |
|---|---|---|---|
| 5,923,525 A * | 7/1999 | Belyakov et al. | 361/502 |
| 6,201,686 B1 * | 3/2001 | Hiratsuka et al. | 361/502 |
| 6,222,720 B1 * | 4/2001 | Aoki et al. | 361/301.5 |
| 6,449,139 B1 * | 9/2002 | Farahmandi et al. | 361/502 |
| 6,603,653 B2 * | 8/2003 | Matsuoka et al. | 361/502 |
| 7,061,747 B2 * | 6/2006 | Togashi et al. | 361/306.3 |

FOREIGN PATENT DOCUMENTS

| | | |
|---|---|---|
| JP | 03-080519 | 4/1991 |
| JP | A 07-263029 | 10/1995 |
| JP | A 11-073937 | 3/1999 |

* cited by examiner

*Primary Examiner*—Nguyen T Ha
(74) *Attorney, Agent, or Firm*—Oliff & Berridge, PLC

(57) ABSTRACT

An electrochemical device of this invention has a stacked member, in which a plurality of collectors having polarizable electrode layers formed on the surfaces thereof and a plurality of separators which separate the adjacent polarizable electrode layers are arranged in alternation, and a pair of fixed collecting plates arranged on both sides in the stacking direction of the stacked member. The pair of fixed collecting plates has a depressed portion which exerts pressure on the stacked member and a protruding portion which forms a gap with the stacked member. The protruding portions terminate at the peripheral portions of the fixed collecting plates so that gaps are formed between the stacked member and the fixed collecting plates. These gaps serve as permeation apertures for electrolytic solution.

9 Claims, 8 Drawing Sheets

ELECTROCHEMICAL DEVICE

BACKGROUND OF THE INVENTION

1. Field of the Invention

This invention relates to an electrochemical device, and in particular relates to an electrochemical device having a pair of fixed collecting plates arranged on both sides of a stacked member, which is the main body, in the stacking direction.

2. Description of the Related Art

In recent years there has been much interest in electrochemical devices such as electric double-layer capacitors for use as batteries which afford comparatively large capacities in a compact size and with light weight. An electric double-layer capacitor does not utilize a chemical reaction as in the case of ordinary secondary batteries, but instead is a battery type which directly accumulates charge on electrodes, and so has the feature of enabling extremely rapid charging and discharging. Applications which exploit this feature are envisioned in, for example, backup power supplies for portable equipment (compact electronic equipment) and similar, and as auxiliary power supplies for electric vehicles and hybrid vehicles; and various studies are being conducted to improve the performance of such batteries.

As the basic construction of an electric double-layer capacitor, a plurality of collectors in which polarizable electrode layers are formed, and a plurality of separators which separate adjacent polarizable electrode layers, are arranged in alternation; the interior of this stacked member is filled with an electrolytic solution. However, in an electric double-layer capacitor which uses a carbon material or similar as the material of the polarizable electrode layers, there is the property that upon charging the polarizable electrode layers expand by approximately 10% in the thickness direction. Consequently the problem arises that when a voltage is applied, the electric double-layer capacitor expands in the stacking direction.

When such expansion occurs, not only is stress applied to the housing due to the deformation, but there is the further problem that the internal resistance of the electric double-layer capacitor increases. Consequently a method is adopted in which a pair of fixed collecting plates or similar are provided in the stacking direction of the stacked member which is the main body of the capacitor, and by this means expansion is suppressed (see Japanese Patent Laid-open No. 3-80519, Japanese Patent Laid-open No. 7-263029, and Japanese Patent Laid-open No. 11-73937).

SUMMARY OF THE INVENTION

As a result of studies of the above-described technology of the prior art, the inventors have discovered the following problem with this technology of the prior art. That is, these inventors have discovered the problem that, if fixed collecting plates are arranged on both sides of the stacked member, then the permeation path of the electrolytic solution is substantially blocked, and the electrolytic solution cannot reach the interior of the stacked member easily. Conceivable methods to resolve this problem include the formation of large holes over a broad range in the fixed collecting plates to enable permeation of electrolytic solution, and employing fixed collecting plates with a mesh shape. However, the inventors found that because in these cases the strength of the fixed collecting plates is greatly decreased, it is no longer possible to adequately suppress expansion of the polarizable electrode layers.

Such a problem occurs not only in electric double-layer capacitors, but also in other electrochemical devices having polarizable electrode layers comprising carbon materials or similar.

The present invention was devised in order to resolve this problem. The object of the present invention is to provide an electrochemical device having a structure enabling easy passage of electrolytic solution into the interior of a stacked member, while effectively suppressing expansion of polarizable electrode layers by means of fixed collecting plates.

An electrochemical device of this invention comprises a stacked member, in which a plurality of collectors having polarizable electrode layers formed on the surfaces thereof and a plurality of separators which separate adjacent polarizable electrode layers are arranged in alternation, and a pair of fixed collecting plates arranged on both sides in the stacking direction of the stacked member; at least one of the pair of fixed collecting plates has a depressed portion which exerts pressure on the stacked member and a protruding portion which forms a gap with the stacked member, and the gap is left open.

In this way, in an electrochemical device of this invention, a depressed portion and a protruding portion are provided on a fixed collecting plate, so that the mechanical strength of the fixed collecting plate itself is increased, and moreover a gap, formed by a protruding portion, is left open between the stacked member and the fixed collecting plate, so that the gap becomes a permeation aperture for the electrolytic solution. Hence expansion of polarizable electrode layers can be effectively suppressed, and electrolytic solution can be made to easily pass into the interior of the stacked member.

In this invention, it is preferable that a portion of the protruding portion be terminated at a peripheral portion of the fixed collecting plate, and that by this means at least a portion of the gap be left open at the peripheral portion of the fixed collecting plate. By means of such a configuration in which the gap is left open at the peripheral portion of the fixed collecting plate, there is no longer a need to open a hole in the fixed collecting plate for permeation of the electrolytic solution, and a decline in the strength of the fixed collecting plate can be prevented.

In this case, it is preferable that the gap be left open at two or more places, and it is preferable that the gap be left open at each of the peripheral portions of the fixed collecting plate. If the gap is thus left open at two or more places, the electrolytic solution can permeate easily.

Moreover, in this case it is preferable that the gap comprise a ring-shape portion along the peripheral portion of the fixed collecting plate and an inflow portion provided between the ring-shape portion and each of the peripheral portions of the fixed collecting plate, and it is still more preferable that a connecting portion, connecting plurality of inflow portions in the interior area of the ring-shape portion, be further comprised. By providing such a ring-shape portion and connecting portion, electrolytic solution which has permeated into the gap can easily pass into the interior of the stacked member.

In this invention, it is preferable that a penetrating hole be provided in depressed portions of the fixed collecting plates and in the stacked member, and that the pair of fixed collecting plates be fixed by means of a fixing pin inserted through the penetrating hole. In this way, by using the penetrating hole which penetrates the depressed portions of the fixed collecting plates to fix the pair of fixed collecting plates, pressure can be more reliably applied to the stacked member. In this case, it is preferable that the penetrating hole provided in the stacked member have a larger diameter in the portions which penetrate the collectors and polarizable electrode layers than in the portions which penetrate the separators. By this means, short-circuits across electrodes which may arise due to insertion of the fixing pin can be prevented.

In this invention, it is preferable that the shapes of the pair of fixed collecting plates be the same. By this means, electrolytic solution permeates in the upward and downward directions, and so not only can electrolytic solution easily pass into the interior of the stacked member, but because the shapes of the pair of fixed collecting plates are the same, mass production properties can be improved.

Thus by means of this invention, a configuration can be obtained in which electrolytic solution can easily pass into the interior of the stacked member, while effectively suppressing expansion of polarizable electrode layers by means of fixed collecting plates.

DESCRIPTION OF THE PREFERRED EMBODIMENTS

Below, preferred embodiments of the present invention are explained in detail, referring to the attached drawings.

Figure 1:
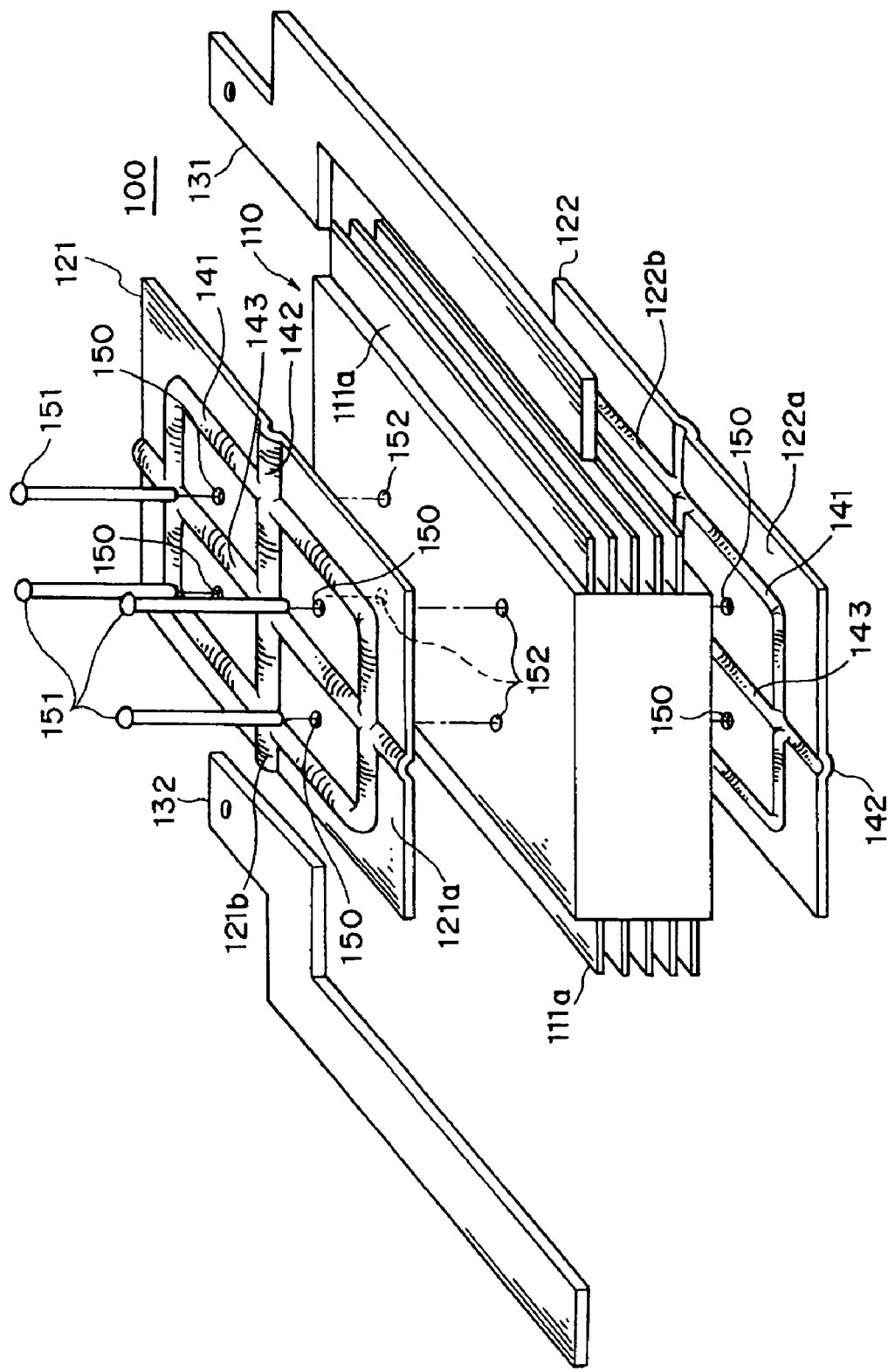
FIG. 1 is a schematic exploded oblique view showing the structure of an electric double-layer capacitor of a preferred embodiment of the present invention.

FIG. 1 is a schematic exploded oblique view showing the structure of the electric double-layer capacitor of a preferred embodiment of the present invention.

As shown in FIG. 1, the electric double-layer capacitor 100 of the present embodiment comprises a stacked member 110, which is the capacitor main unit; a pair of fixed collecting plates 121, 122, arranged on both sides in the stacking direction of the stacked member 110; and a pair of collector bars 131, 132, connected to both end faces of the stacked member 110.

Figure 2:
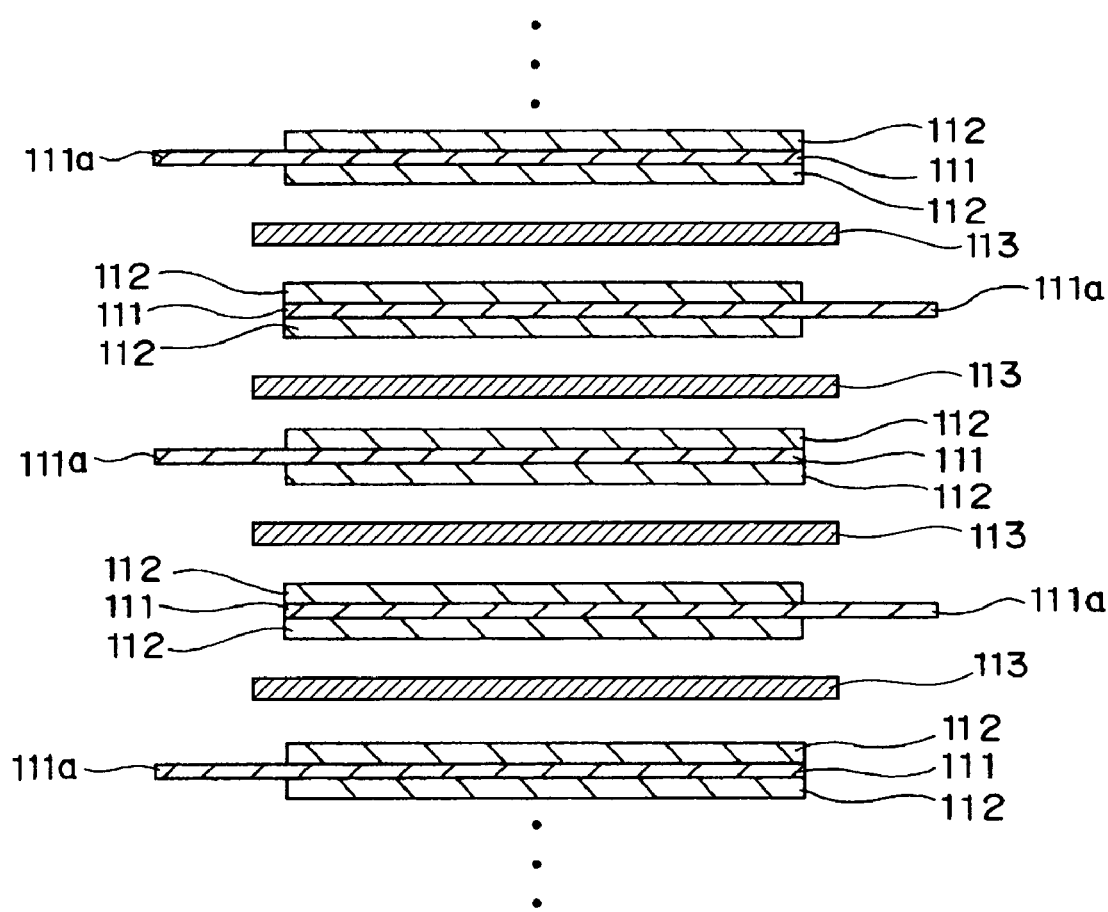
FIG. 2 is a schematic cross-sectional view used to explain the structure of the stacked member 110.

As shown in the schematic cross-sectional view of FIG. 2, the stacked member 110 has, arranged in alternation, a plurality of collectors 111, on both surfaces of which are formed polarizable electrode layers 112, and a plurality of separators 113 which separate the adjacent polarizable electrode layers 112. As shown in FIG. 2, draw-out portions 111a, on which polarizable electrode layers 112 are not formed, are provided on the collectors 111; the direction of drawing-out of the draw-out portions 111a alternates between opposite directions. Hence among the draw-out portions 111a, if for example the draw-out portion 111a positioned on the right side in FIG. 2 is a positive electrode, then the draw-out portion 111a positioned on the left side is a negative electrode.

These draw-out portions 111a are bundled on the positive-electrode and negative-electrode sides, and are respective connected to the collector bars 131, 132. Hence in a s tate of actual use, one of the collector bars 131, 132 is used as a positive terminal, and the other is used as a negative terminal.

No particular limitations are placed on the material of the collectors 111, so long as the collectors 111 are good conductors where electric charge can move sufficiently to the polarizable electrode layers 112, and well-known collector materials used in the electrodes of electric double-layer capacitors, such as for example aluminum (Al), can be used. While no particular limitations are imposed, it is preferable that the surfaces of the collectors 111 be roughened; by this means, adhesion of the collectors 111 and the polarizable electrode layers 112 can be improved. No particular limitations are placed on the method of roughening of the surfaces of collectors 111, but roughening can be performed by chemical etching using acids or other chemicals.

No particular limitations are imposed on the thickness of collectors 111 either, but in order that manufactured electric double-layer capacitors be made more compact, it is preferable that the thickness be set as small as possible while still maintaining adequate mechanical strength. Specifically, when aluminum (Al) is used as the material of the collectors 111, it is preferable that the thickness be set to 10 μm or greater but to 100 μm or less, and still more preferable that the thickness be set to 15 μm or greater but 50 μm or less. If the thickness of collectors 111 of aluminum (Al) is set within this range, it is possible to achieve electric double-layer capacitors which can ultimately be manufactured in a compact shape, while maintaining sufficient mechanical strength.

A polarizable electrode layer 112 is a layer which contributes to charge accumulation and discharge; it is preferable that such layers be formed by application onto the surfaces of a collector 111. A polarizable electrode layer 112 comprises, as constituent materials, porous particles having electron conduction properties, and a binder capable of binding porous particles. Further, it is preferable that a polarizable electrode layer 112 comprise, in addition to porous particles and a binder, a conduction auxiliary agent having electron conduction properties.

No particular limitations are placed on the porous particles included in polarizable electrode layers 112, so long as the porous particles have electron conduction properties contributing to charge accumulation and discharge; for example, activated carbon in either particle form or fiber form which has undergone activation treatment can be used. As such activated carbon, phenolic active carbon, coconut shell activated carbon, and similar can be used. It is preferable that the average particle size of the porous particles be from 3 to 20 μm; it is preferable that the BET specific surface area, determined from the nitrogen adsorption isotherm using the BET adsorption isotherm equation, be 1500 $m^2/g$ or higher, and more preferably from 2000 to 2500 $m^2/g$. By using such porous particles, a high volume capacity can be obtained.

Further, no limitations in particular are placed on the binder included in the polarizable electrode layers 112 so long as the binder is capable of binding the above porous particles; for example, polytetrafluoroethylene (PTFE), polyvinylidene fluoride (PVDF), fluoro rubbers, and other fluoride binders can be used satisfactorily. This is because, due to the bonding energy difference between C—F and C—H, fluoride binders are superior to cellulose binders and acrylic binders in electrochemical properties. Among fluoride binders, it is preferable that a fluoro rubber be used. This is because if a fluoro rubber is used, sufficient binding of porous particles is possible even when a small amount is comprised, so that the applied film strength of the polarizable electrode layers 112 can be improved, and because the size of the double-layer interface is increased, so that volume capacity can also be increased. In addition, fluoro rubbers are electrochemically stable.

As fluoro rubbers, for example, vinylidene fluoride-hexafluoropropylene-tetrafluoropropylene (VDF-HFP-TFE) copolymers, vinylidene fluoride-hexafluoropropylene (VDF-HFP) copolymers, vinylidene fluoride-pentafluoropropylene (VDF-PFP) copolymers, vinylidene fluoride-pentafluoropropylene-tetrafluoroethylene (VDF-PFP-TFE) copolymers, vinylidene fluoride-perfluoromethylvinyl ether-tetrafluoroethylene (VDF-PFMVE-TFE) copolymers, vinylidene fluoride-chlorotrifluoroethylene (VDF-CTFE) copolymers, ethylene-tetrafluoroethylene copolymers, propylene-tetrafluoroethylene copolymers, and similar can be used. Among these, fluoro rubbers resulting from copolymerization of at least two polymers selected from a group consisting of VDF, HFP, and TFE are preferable; and in particular, due to tendencies for further improvement of adhesive properties and resistance to chemicals, VDF-HFP-TFE copolymers, obtained by copolymerization of three polymers in the above group, are particularly preferable.

Further, no limitations in particular are imposed on the conduction auxiliary agent which is included as necessary in the polarizable electrode layers 112, so long as the agent has electron conduction properties enabling adequate promotion of the movement of charge between collectors 111 and polarizable electrode layers 112; for example, it is preferable that carbon black or graphite be used.

As carbon black, for example, acetylene black, ketjen black, furnace black, or similar can be used; among these, acetylene black can be used satisfactorily. It is preferable that the average particle size of the carbon black be from 25 to 50 nm; it is preferable that the BET specific surface area be 50 $m^2/g$ or higher, and still more preferably from 50 to 140 $m^2/g$.

As graphite, for example, natural graphite, artificial graphite, expanding graphite, and similar can be used; in particular, it is preferable that artificial graphite be used. It is preferable that the average particle size of the graphite be 4 to 6 μm, and it is preferable that the BET specific surface area be 10 $m^2/g$ or higher, and more preferably still from 15 to 30 $m^2/g$.

The separators 113 are films which physically separate adjacent polarizable electrode layers 112, while enabling movement of electrolytic solution between adjacent polarizable electrode layers 112. It is preferable that separators 113 be formed from a porous insulating material; for example, a stacked member of films comprising polyethylene, polypropylene, or polyolefin, a stretched film of a mixture of the above resins, or, an unwoven cloth comprising at least one constituent component selected from a group consisting of cellulose, polyesters, and polypropylene, can be used. No limitations in particular are placed on the thickness of separators 113, but it is preferable that the thickness be 15 μm or greater but 200 μm or less, and more preferably still 30 μm or greater but 100 μm or less.

Figure 3:
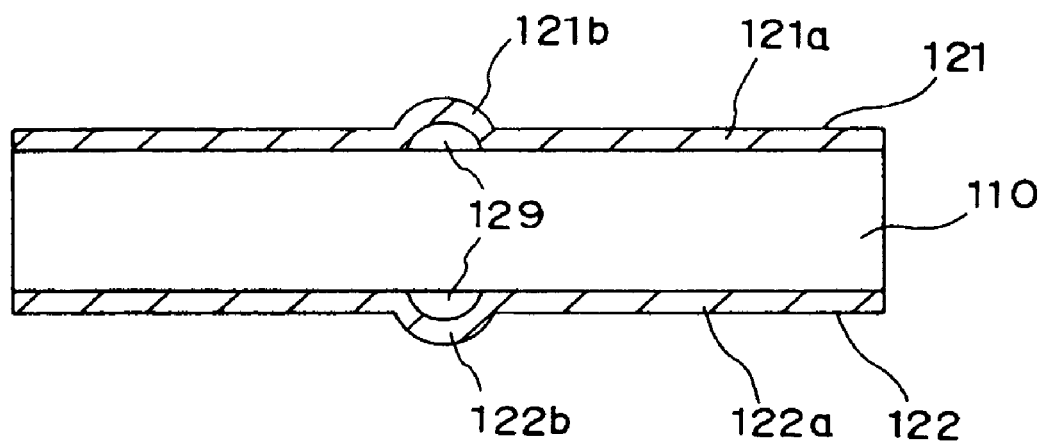
FIG. 3 is a schematic side view used to explain the relation between the stacked member 110 and the fixed collecting plates 121, 122.

The fixed collecting plates 121, 122 are arranged on both sides in the stacking direction of the stacked member 110, and serve to suppress expansion of polarizable electrode layers 112 accompanying charging. As shown in FIG. 1, the same depression/protrusion pattern is provided on both of the fixed collecting plates 121, 122. By this means, when the stacked member 110 is enclosed between the fixed collecting plates 121, 122, as shown in the schematic side view of FIG. 3, there is contact with the stacked member 110 in the depressed portions 121a, 122a, while there is no contact with the stacked member 110 in the protruding portions 121b, 122b, so that a gap 129 is formed. The depressions and protrusions provided in the fixed collecting plates 121, 122 serve to increase the mechanical strength of the fixed collecting plates 121, 122, and the gap 129 formed by the protruding portions 121b, 122b serves as a path for flow of electrolytic solution, described below.

As shown in FIG. 1, portions of the protruding portions 121b, 122b terminate at the peripheral portions of the fixed collecting plates 121, 122. By this means, when the stacked member 110 is enclosed by the fixed collecting plates 121, 122, the gaps 129 formed by the protruding portions 121b, 122b are left open at a total of four places at the peripheral portions of the fixed collecting plates 121, 122. The open portions of the gaps 129 serve as permeation apertures for electrolytic solution, described below.

In the following, the depression/protrusion shapes of the fixed collecting plates 121, 122 will be explained in further details. The protruding portions 121b, 122b comprise ring-shape portions 141 along the peripheral portions of the fixed collecting plates 121, 122; inflow portions 142 provided between the ring-shape portions 141 and the peripheral portions of the fixed collecting plates 121, 122; and two connecting portions 143 which connect two opposing inflow portions 142 in the interior area of the ring-shape portions 141. The two connecting portions 143 intersect substantially in the center portions of the fixed collecting plates 121, 122; by this means, the ring-shape portions 141 and the connecting portions 143 substantially assume the shape of a square divided into four smaller squares. However, the position of the connecting portion 143 is not limited to this position, and the portion may be provided in another position, so long as the interior-side area of the ring-shape portion 141 is connected.

No limitations in particular are placed on the height of the gap 129; as an example, if the width W of the protruding portions 121b, 122b is approximately 8 mm, then the height of the gap 129 may be set to approximately 0.5 mm. The higher the gap 129, the more readily electrolytic solution permeates; but if the height of the gap 129 is too great, the overall thickness of the electric double-layer capacitor 100 increases. Hence the height of the gap 129 must be set taking into consideration the ease of permeation of electrolytic solution, and the tolerable thickness of the electric double-layer capacitor 100.

Four penetrating holes 150 are provided in the depressed portions 121a, 122a of the fixed collecting plates 121, 122, and fixing pins 151, comprising an insulating material, are inserted into the penetrating holes. As shown in FIG. 1, the positions at which the penetrating holes 150 are formed are in four regions surrounded by protruding portions 121b, 122b. These penetrating holes 150 are provided in the depressed portions 121a, 122a because the depressed portions 121a, 122a then become the faces applying pressure to the stacked member 110. The diameters of these four penetrating holes 150 can be made small, and the number of holes is small, so that the strength of the fixed collecting plates 121, 122 is reduced hardly at all as a result.

Figure 4:
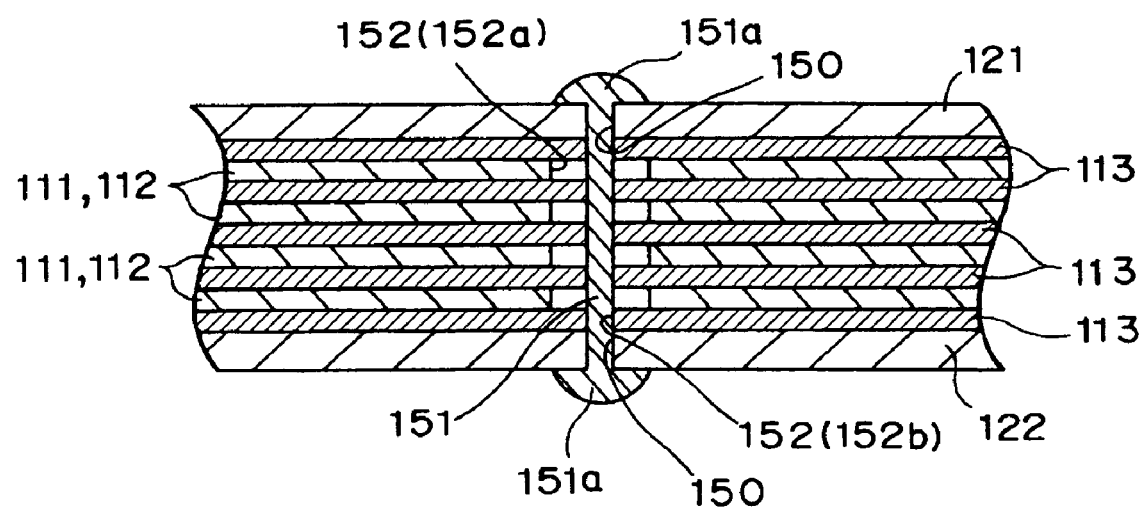
FIG. 4 is a schematic cross-sectional view used to explain the shape of the penetrating holes 152.

The fixing pins 151 penetrate the penetrating holes 150 provided in the fixed collecting plates 121, 122 and the penetrating holes 152 provided in the stacked member 110, and are fixed to the fixed collecting plates 121, 122 by dual-head portions 151a the diameters of which are enlarged, as shown in FIG. 4. By this means, the pair of fixed collecting plates 121, 122 is held in place by the fixing pins 151, and as a result expansion of the stacked member 110 is suppressed.

The penetrating holes 152 provided in the stacked member 110 are provided penetrating the collectors 111 on which are formed polarizable electrode layers 112 and the separators 113; but as shown in FIG. 4, among the penetrating holes 152, the portions 152b penetrating the separators 113 are smaller in diameter than the portions 152a penetrating the collectors 111 and polarizable electrode layers 112. The diameters of the portions 152b penetrating the separators 113 are substantially equal to the diameters of the fixing pins 151, so that the fixing pins 151 and the separators 113 are in a state of contact substantially over the entire circumference.

On the other hand, the portions 152a penetrating the collectors 111 and polarizable electrode layers 112 have diameters larger than those of the fixing pins 151, and moreover are placed in positions which are substantially concentric with the portions 152b penetrating the separators 113, so that the inner-wall portions of the collectors 111 and polarizable electrode layers 112 are removed by substantially an equal distance over the entire circumference from the fixing pins 151. That is, the fixing pins 151 and the collectors 111 and polarizable electrode layers 112 are not effectively in contact. This is because if the fixing pins 151 make contact with the collectors 111 and polarizable electrode layers 112, then during insertion of the fixing pins 151 the material comprised by the polarizable electrode layers 112 intrudes into the penetrating holes 152, and as a result there is the concern of short-circuits between pairs of electrodes which are meant to be separated by separators 113.

Figure 5:
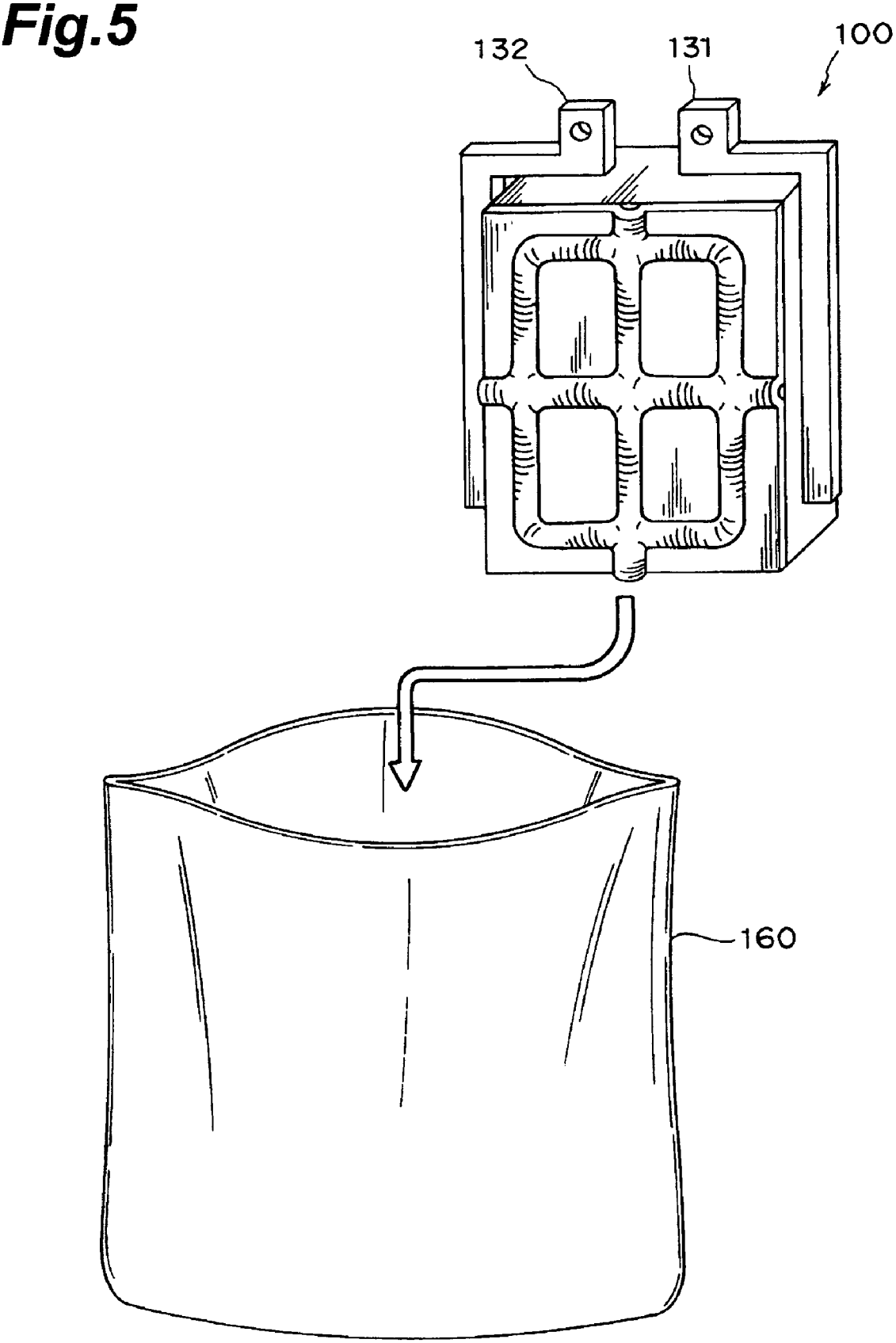
FIG. 5 shows an electric double-layer capacitor 100 and a sealing bag 160 into which the capacitor is inserted.

As shown in FIG. 5, an electric double-layer capacitor 100 having such a structure is housed inside a sealing bag 160 within which is electrolytic solution, and the bag is sealed in a state in which portions of the collector bars 131, 132 are exposed. As the sealing bag 160, aluminum laminated sheet or similar can be used.

As the electrolytic solution, a well-known electrolytic solution (electrolytic aqueous solution, or electrolytic solution using an organic solvent) employed in electric double-layer capacitors can be used. However, because electrochemically the decomposition voltage of the electrolytic solution used in the electric double-layer capacitor is low, the withstand voltage of the capacitor is limited to a low value, and so it is preferable that an electrolytic solution using an organic solvent (a non-aqueous electrolytic solution) be used. No limitations in particular are placed on the specific type of electrolytic solution, but it is preferable that the electrolytic solution be selected taking into consideration the solubility of the solute, degree of dissociation, and viscosity of the liquid; and it is particularly desirable that the electrolytic solution have high conductivity and a high potential window (high decomposition initiation voltage). As representative examples, quaternary ammonium salts, such as tetraethyl ammonium tetrafluoroborate, dissolved in an organic solvent such as propylene carbonate, diethylene carbonate, or acetonitrile, are used. In this case, intermixing of water must be rigorously controlled.

When an electric double-layer capacitor 100 of this embodiment is housed within a sealing bag 160 in which electrolytic solution is present, the electrolytic solution can easily permeate from the open portions of the gap 129 formed by the protruding portions 121b, 122b. The electrolytic solution permeating into the gap 129 flows from the inflow portions 142 in the gap 129 into the ring-shape portion 141 and connecting portions 143, and smoothly passes into the interior of the stacked member 110.

Then, the electric double-layer capacitor 100 together with the sealing bag 160 is housed in a housing (plastic case or similar), not shown, to obtain the final product. In the state of actual use, by repeating charging and discharging the polarizable electrode layers 112 expand, and so the stacked member 110 attempts to expand in the stacking direction. However, the fixed collecting plates 121, 122 are held in place by the fixing pins 151, and so expansion of the stacked member 110 is suppressed, and as a result deformation can be prevented.

As explained above, in an electric double-layer capacitor 100 of this embodiment, protrusion/depression patterns are provided on the fixed collecting plates 121, 122 which press against the stacked member 110, so that a high mechanical strength can be obtained. Further, the gaps 129 formed by the protruding portions 121b, 122b are left open at the edges of the gaps 129, so that electrolytic solution can easily permeate, and electrolytic solution can easily pass into the interior of the stacked member 110.

In the above, a preferred embodiment of the invention has been explained; but the invention is not limited to the above embodiment, and various modifications are possible without deviating from the gist of the invention. These modifications are of course also included within the scope of the invention.

For example, in the above embodiment, the gaps 129 formed by the protruding portions 121b, 122b are open at a total of four places in each of the peripheral portions of the fixed collecting plates 121, 122; but the invention is not limited to such a configuration, and it is sufficient that the gap be open at at least one place. However, if the gap is open at two or more places as in the above embodiment, electrolytic solution can permeate more readily.

Figure 6:
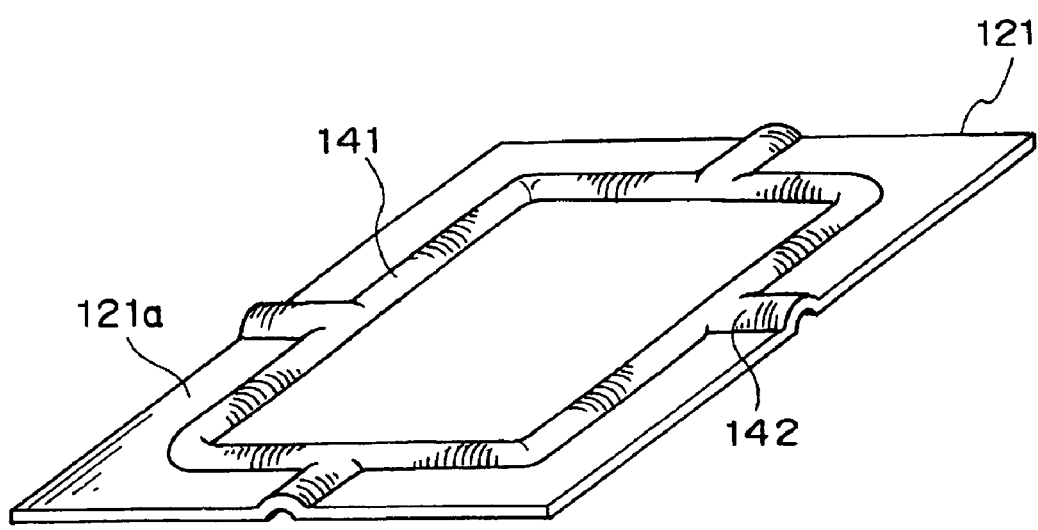
FIG. 6 is a schematic oblique view showing the structure of a fixed collecting plate 121 in a modified example.
Figure 7:
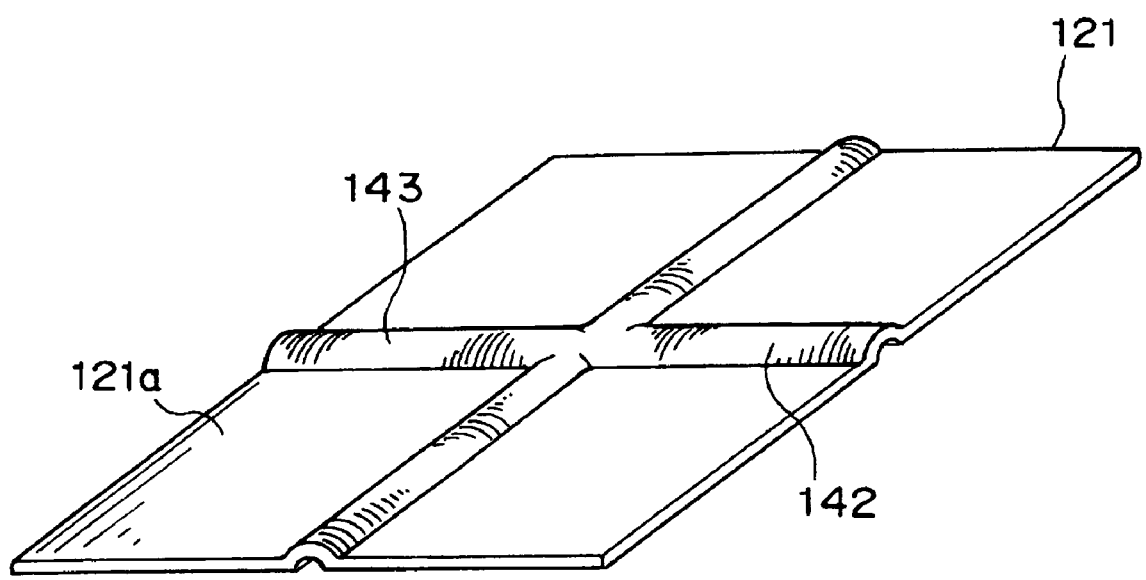
FIG. 7 is a schematic oblique view showing the structure of a fixed collecting plate 121 in another modified example.

Further, the shapes of the protruding portions 121b, 122b which form the gaps 129 are not limited to the shapes indicated in the above embodiment, and a shape which omits the connecting portions 143 as shown in FIG. 6 may be used, as well as a shape which omits the ring-shape portion 141 as shown in FIG. 7.

Figure 8:
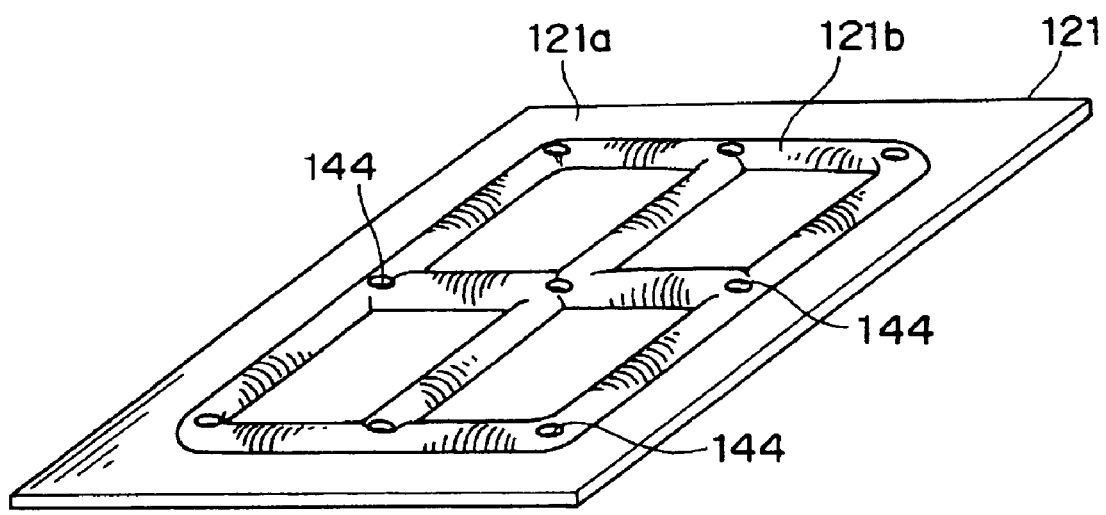
FIG. 8 is a schematic oblique view showing the structure of a fixed collecting plate 121 in still another modified example.

Further, in the above embodiment, the protruding portions 121b, 122b are terminated at the peripheral portions of the fixed collecting plates 121, 122, and by this means the gaps 129 are left open at the peripheral portions of the fixed collecting plates 121, 122; but the open positions of the gaps 129 are not limited to these positions. For example, as shown in FIG. 8, by providing penetrating holes 144 in the protruding portion, the gap 129 may be opened. However, rather than this case, it is preferable that, as described in the above embodiment, the gaps 129 be opened by causing the protruding portions 121b, 122b to be terminated at the peripheral portions of the fixed collecting plates 121, 122, both because machining of the fixed collecting plates 121, 122 is simple, and because there is no tendency for the strength of the fixed collecting plates 121, 122 to be reduced.

Further, in the above embodiment, the pair of fixed collecting plates 121, 122 have the same shape; but this invention is not limited to such a configuration, and for example one of the fixed collecting plates 121, 122 may have a simple flat-plate shape. However, if the pair of fixed collecting plates 121, 122 have the same shape, as in the above embodiment, then electrolytic solution can permeate from above and from below, so that the electrolytic solution can easily pass into the interior of the stacked member 110, and in addition the number of parts can be reduced, so that mass production properties can be improved as well.

This invention is not limited to electric double-layer capacitors, but can also be applied to pseudo-capacity capacitors, pseudo-capacitors, redox capacitors, and various other kinds of electrochemical capacitors.

What is claimed is:

1. An electrochemical device, comprising:
 a stacked member, in which a plurality of collectors having polarizable electrode layers formed on the surfaces thereof and a plurality of separators which separate the adjacent polarizable electrode layers are arranged in alternation; and a pair of fixed collecting plates, arranged on both sides in the stacking direction of the stacked member, wherein at least one of the pair of fixed collecting plates has a depressed portion which exerts pressure on the stacked member and a protruding portion which forms a gap with the stacked member, and the gap is left open.

2. The electrochemical device according to claim 1, wherein a portion of the protruding portion terminates at the peripheral portion of the fixed collecting plate, so that at least a portion of the gap is left open at the peripheral portion of the fixed collecting plate.

3. The electrochemical device according to claim 1, wherein the gap is left open at two or more places.

4. The electrochemical device according to claim 3, wherein the gap is left open at each peripheral portion of the fixed collecting plate.

5. The electrochemical device according to claim 4, wherein the gap comprises a ring-shape portion along the peripheral portion of the fixed collecting plate and an inflow portion provided between the ring-shape portion and each peripheral portion of the fixed collecting plate.

6. The electrochemical device according to claim 5, wherein the gap further comprises a connecting portion which connects a plurality of inflow portions in the interior area of the ring-shape portion.

7. The electrochemical device according to claim 1, wherein a penetrating hole is provided in the depressed portions of the fixed collecting plates and in the collectors, and the pair of fixed collecting plates is fixed by a fixing pin inserted into the penetrating hole.

8. The electrochemical device according to claim 7, wherein the penetrating hole provided in collectors has a larger diameter in portions penetrating the collectors and the polarizable electrode layers than in portions penetrating the separators.

9. The electrochemical device according to claim 1, wherein the pair of fixed collecting plates has the same shape.

* * * * *